Feb. 14, 1956 A. H. DICKINSON 2,735,011

OSCILLATING CIRCUIT

Filed Feb. 1, 1951 5 Sheets-Sheet 1

Inventor
ARTHUR H. DICKINSON

By

Charles E. McTiernan

Attorney

OSCILLATING CIRCUIT

Filed Feb. 1, 1951 5 Sheets-Sheet 2

Inventor
ARTHUR H. DICKINSON
By Charles E. McTiernan
Attorney

Inventor
ARTHUR H. DICKINSON
By
Charles C. McTiernan
Attorney

Inventor
ARTHUR H. DICKINSON
By
Charles E. McTiernan
Attorney

Feb. 14, 1956 A. H. DICKINSON 2,735,011

OSCILLATING CIRCUIT

Filed Feb. 1, 1951 5 Sheets-Sheet 5

Inventor
ARTHUR H. DICKINSON

By Charles E. McTiernan

Attorney

United States Patent Office 2,735,011

Patented Feb. 14, 1956

2,735,011

OSCILLATING CIRCUIT

Arthur H. Dickinson, Greenwich, Conn., assignor to International Business Machines Corporation, New York, N. Y., a corporation of New York Application February 1, 1951, Serial No. 208,966

5 Claims. (Cl. 250—36)

This invention relates in general to an oscillation generator and more specifically to a negative resistance oscillating circuit.

The principal object of the invention is to provide an oscillation generator in which the usual electron discharge device is replaced by a variable resistance element including a body of semi-conductor material.

Another object of the invention is to provide a relaxation oscillator including a semi-conductive element having positive and negative resistivity characteristics.

A further object of the invention is to provide an oscillator circuit arrangement including a crystal triode.

A still further object of the invention is to provide a two terminal oscillating circuit including a semi-conductive element having a positive and negative resistivity characteristic.

Other objects of the invention will be pointed out in the following description and claims and illustrated in the accompanying drawings, which disclose, by way of example, the principle of the invention and the best mode, which has been contemplated, of applying that principle.

A crystal diode may be briefly described as a rectifying element including a minute block of "doped" semi-conductive matter having positive and negative resistivity characteristics under certain operating conditions, such as germanium or silicon, which is plated with metal on one surface and connected with an extremely fine metallic whisker on the parallel surface. The positive resistance characteristic may be defined as one in which there is a change in current in the same sense for each change of potential while in the case of the negative resistance characteristic the current varies inversely with the voltage.

Figure 1:
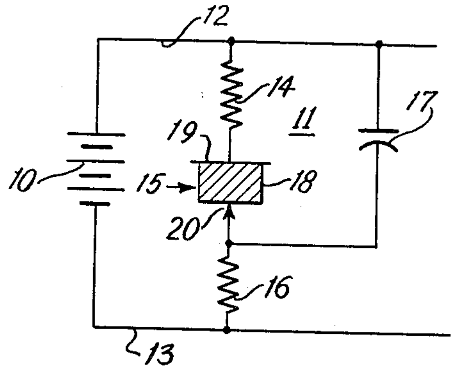
Fig. 1 is an oscillating circuit illustrating the use of a crystal diode therein.

Referring now in detail to Fig. 1, there is represented therein a source of potential 10 which supplies energy to the novel oscillating circuit arrangement 11 through the positive conductor 12 and the negative conductor 13. The oscillating circuit arrangement which is coupled across the source of potential 10 between the conductors 12 and 13 comprises a resistor 14, a crystal diode 15, and a resistor 16 serially connected with a capacitor 17 connected in parallel with the resistor 14 and the diode 15. While the resistors 14 and 16 and the capacitor 17 are shown as fixed elements, it should be noted that these elements may be replaced by adjustable elements without departing from the scope of the invention.

The crystal diode 15 includes a minute block of "doped" semi-conductive material 18, such as germanium or silicon, which is plated with a metallic base 19 on one surface and connected with an extremely fine metallic whisker 20 on the parallel surface. Now when the applied voltage of the base 19 with respect to the whisker 20 is positive, as is the case of Fig. 1, the diode 15 exhibits relatively high resistance properties commonly termed high back resistance. Also when the applied voltage of the whisker 20 with respect to the base 19 is positive the diode 15 exhibits relatively low resistance properties commonly referred to as low forward resistance. Thus the crystal diode 15 having the features of a high back resistance and a low forward resistance, which are essential characteristics of a rectifier, functions as a rectifying element.

As described in "Crystal Rectifiers" by H. C. Torrey and C. A. Whitmer, Radiation Laboratory Series Volume 15 (McGraw-Hill 1948), the rectifying action of the crystal diode 15 results from the properties of the surface layer of the semi-conductor 18 at the point of contact with the whisker 20. In the region of this contact, there is an excess concentration of negative charge which acts as a potential barrier to the flow of electrons from the semi-conductor or crystal into the whisker. When a negative potential is applied to the whisker, the height of this barrier is increased so that the number of electrons having sufficient energy to pass over the barrier is greatly diminished. But when a positive potential is applied to the whisker, the number of electrons having sufficient energy to pass over the barrier is increased. If the relation between the current passed by the barrier and the voltage supplied between the whisker and the base were linear, there would be no rectification since the resistance would be constant. However, this is not the case since this relation is exponential and therefore extremely nonlinear thereby making rectification possible by approximating the characteristic curve of an ideal rectifier. A more complete description concerning the barrier theory of rectification may be found in the aforementioned textbook.

The functioning of the circuit of Fig. 1 may be attributed to the joint action of the crystal diode 15 passing to and from a positive to a negative resistance region and the charging and discharging of the condenser 17. When a source of potential such as 10 is applied to the oscillating circuit 11 the voltage across the capacitor 17, which is also the voltage across the crystal diode 15 and the resistor 14 due to the parallel circuit arrangement, will increase as the capacitor 17 is charged through the series resistance 16. At the time that the capacitor voltage reaches a value equal to the peak voltage $V_{ck}$ as shown in the diode characteristic curve 42 of Fig. 2, the crystal diode passes from a positive to a negative resistance region thereby presenting a low resistance path to the capacitor 17 whereby the capacitor 17 begins to discharge through this low resistance path now presented by the diode 15. The capacitor will continue to discharge until the voltage across the diode 15 reaches a value that is too low to maintain the crystal in its low resistance state. When this condition occurs the diode 15 then returns back to the high resistance state encountered in the positive resistance region, causing the capacitor 17 to charge up again through the resistor 16. This cycle of operation is continued indefinitely as long as the source of potential 10 is coupled to the oscillating circuit 11.

Figure 3:
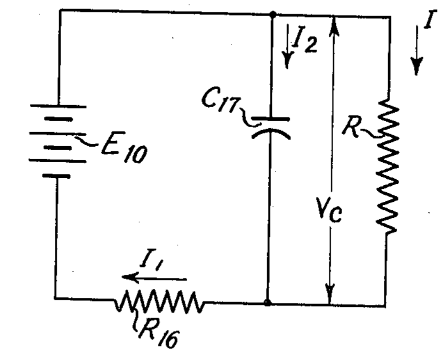
Fig. 3 is an equivalent circuit diagram of the circuit arrangement of Fig. 1.

The oscillating operation may be shown mathematically by referring to the equivalent circuit of Fig. 3. In applying Kirchoff's laws to this circuit, it is found that $$I_1 = I + I_2 \quad (1)$$

Now since $$I = \frac{V_c}{R}$$

where R includes the resistance of the crystal diode 15 and the resistor 14, and $$I_2 = C_{17}\frac{d(V_c)}{dt}$$

then upon substituting these values of I and $I_2$ in Equation 1 we may write $$I_1 = \frac{V_c}{R} + C_{17}\frac{d(V_c)}{dt} \quad (2)$$

Also from Fig. 3 it is found that $$V_c = E_{10} - I_1R_{16}$$

which upon solving for $I_1$ and substituting in Equation 2 produces $$\frac{E_{10} - V_c}{R_{16}} = C_{17}\frac{d(V_c)}{dt} + \frac{V_c}{R}$$

from which may be obtained $$\left(\frac{E_{10}R}{R+R_{16}}\right) - V_c = \frac{C_{17}R_{16}R}{R+R_{16}}\frac{d(V_c)}{dt} \quad (3)$$

Equation 3 now shows that if the value R, representing the combined resistances of the diode 15 and the resistor 14, were constant, the capacitor would charge up until $$\frac{d(V_c)}{dt}$$

becomes zero which condition will be attained when the capacitor voltage is in equilibrium with the supply voltage $E_{10}$ as represented by the relationship $$V_c = \frac{(R)}{R+R_{16}}E_{10} \quad (4)$$

From the instant this relationship is achieved, the capacitor voltage $V_c$ would remain fixed.

However, due to the capabilities of the crystay diode to pass from a high resistance state to a low resistance state, and vice versa, the value R does not remain constant. For example, when the diode is in a positive resistance region it is in a high resistance state, while when the diode is in a negative resistance region it is in a low resistance state. Thus when the diode is in the high resistance state the relationship $$\frac{E_{10}R}{R+R_{16}}$$

in Equation 3 will be greater than the value $V_c$ resulting in $$\frac{d(V_c)}{dt}$$

being positive, which corresponds to the charging of the capacitor, while when the diode is in a low resistance state the relationship $$\frac{E_{10}R}{R+R_{16}}$$

in Equation 3 will be less than $V_c$ resulting in $$\frac{d(V_c)}{dt}$$

being negative, which corresponds to the discharging of the capacitor.

Figure 4:
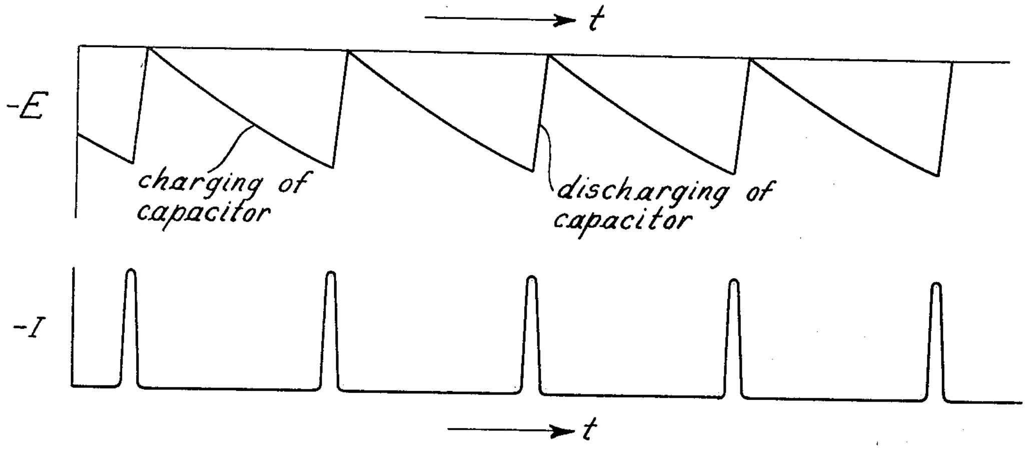
Fig. 4 illustrates current and voltage waveforms for the circuit arrangement of Fig. 1.

The repetitive charging and discharging of the capacitor 17 can be best observed by referring to the voltage and current waveforms of the diode in Fig. 4. The voltage waveform is seen to rise negatively in an exponential fashion to some fixed value while the capacitor is being charged, and then to fall rapidly to zero when the capacitor is being discharged. The peak pulses of the current waveform of Fig. 4 coincide in time with the rapid drops in voltage corresponding to the discharge of the condenser.

Figure 2:
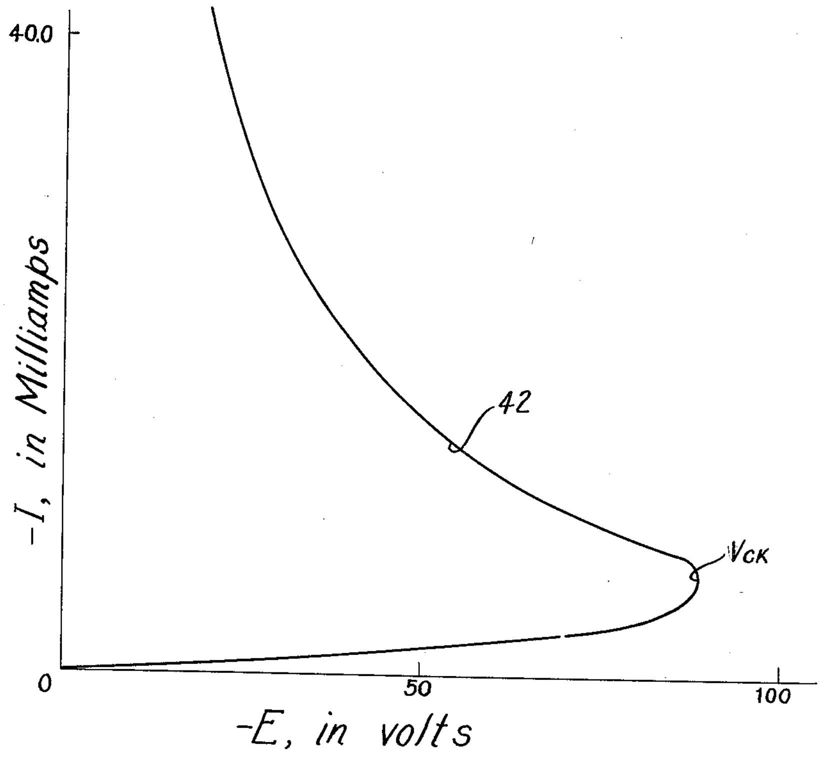
Fig. 2 is an electrical characteristic curve for the crystal diode.
Figure 5:
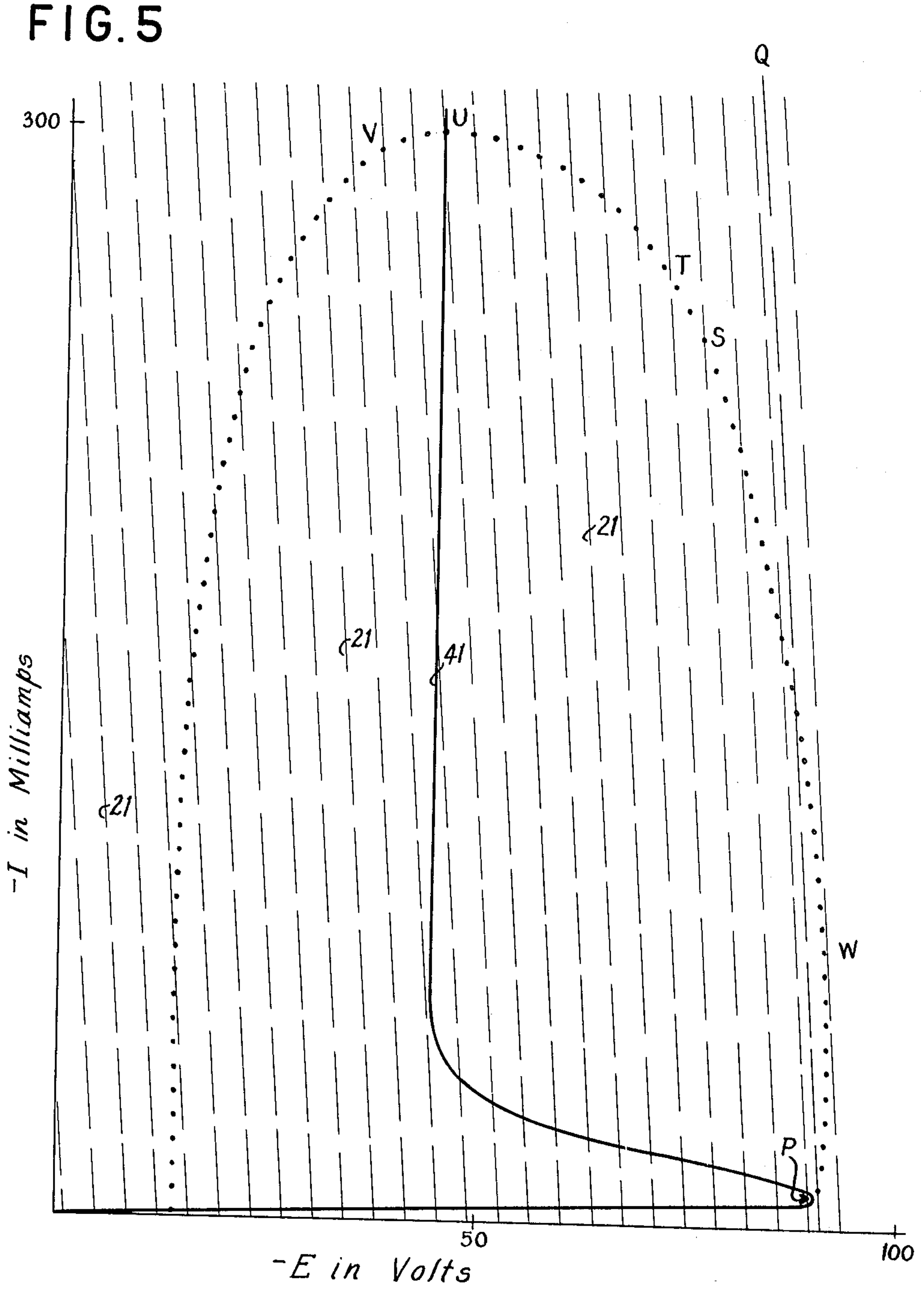
Fig. 5 is an operating characteristic curve for the circuit arrangement of Fig. 1.

A graphical analysis of the operation of the circuit arrangement of Fig. 1 shall now be given with particular reference being made to Fig. 5. This figure contains a characteristic curve 41 for the diode which was observed on the oscilliscope and which runs to much higher current values than the characteristic curve 42 of Fig. 2. The curve 42 of Fig. 2 is limited as to its current value since an extension to higher values would cause a burnout of the whisker. The curve 42 of Fig. 2, which is obtained by static current and voltage measurements, represents the locus of operating conditions to which the diode reverts as thermal equilibrium is established. The characteristic curve 41 of Fig. 5 differs from the curve 42 of Fig. 2 inasmuch as it only represents a set of intermediate equilibrium conditions since the crystal does not have time to reach thermal equilibrium at each value of the current due to the fact that the diode has a relaxation time of the order of only ten microseconds.

Now as the capacitor 17 charges up through the resistor 16, the load line 21 moves from the left to the right in Fig. 5. The load line 21 is the locus of values of voltage E and current I, respectively, across and through the diode 15 that are permitted by the resistor 14 when the voltage $V_c$ across the capacitor is determined. The equation defining this condition is therefore $$E + IR_{14} = V_c \quad (5)$$

During the charging cycle the point of intersection of this load line with the characteristic curve 41 of Fig. 5 defines the operating condition of the circuit arrangement of Fig. 1 for each value of capacitor voltage $V_c$ inasmuch as it is only at this point that the required current-voltage relationship of the diode 15 and the resistor 14 can be satisfied simultaneously.

As the capacitor 17 is charged up, the operating point moves to the right along the characteristic curve 41 to the point P. At point P the diode is still in a positive resistance region. Therefore the resistance of the diode is still high and as a result the capacitor 17 continues to charge, causing the load line to move to the right of position P. At this new position to the right of position P, the load line no longer intersects the characteristic curve at a high resistance point but at a point Q of high current and consequently low diode resistance.

The diode resistance now begins to decrease in order to meet the new requirements defined by this new position of the load line as denoted by position Q, but it is unable to do such instantaneously because of the order of the relaxation time of the diode.

Now if the voltage across the capacitor were to remain constant at this point, the operating point would move up along the fixed load line to position Q because the current-voltage relation required by resistor 14 is not affected by the charge of the state of the diode. However, the capacitor voltave $V_c$ continues to vary so the operating point moves up along a moving load line. The capacitor voltage $V_c$ increases causing the capacitor to be charged until the operating point W has been reached. At position W, the diode resistance is of such a magnitude that the capacitor voltage $V_c$ is in equilibrium with the supply voltage $E_{10}$ since $$\frac{d(V_c)}{dt}$$

in Equation 3 is now equal to zero.

After assuming position W, the diode resistance still continues to decrease in its adjustment toward seeking a stable value such that in Equation 3 the value $$\frac{E_{10}R}{R+R_{16}}$$

becomes less than $V_c$ so that $$\frac{d(V_c)}{dt}$$

assumes a negative value which indicates that the capacitor is now discharging through the diode. When the capacitor 17 begins to discharge the load line starts to move back to the left and the operating point moves up through positions S and T.

About the time that operating points S and T have been assumed, the slope of the curve as traced by the operating point, and which is represented in Fig. 5 in dotted form, begins to decrease. The reduction in the slope of the operating point curve may be attributed to an increase in the rate of discharge of the capacitor as the resistance of the diode continues to decrease and to a decrease in the velocity of the operating point along the load line as it approaches an equilibrium condition.

Equation 5 which is the equation for the load line may be used to show that the slope of the operating point curve is decreasing. Upon differentiating Equation 5, the reciprocal of the slope of the curve traced by the operating point is seen to be $$\frac{d(E)}{dI}=-R+\frac{\frac{d(V_c)}{dt}}{\frac{d(I)}{dt}} \quad (6)$$

Now since the capacitor is discharging through the diode which is decreasing in resistance, the rate of charge of voltage as represented by the expression $$\frac{d(V_c)}{dt}$$

is negative and increasing. Likewise inasmuch as the diode is decreasing in resistance the rate of charge of current as represented by the relationship $$\frac{d(I)}{dt}$$

is positive and increasing.

Thus it becomes obvious that in Equation 6 the relationship $$\frac{d(E)}{dI}$$

must be negative and increasing since the expression $$\frac{d(V_c)}{dt}$$

is negative and increasing while the relationship $$\frac{d(I)}{dt}$$

is positive and increasing. It then follows that the slope of the operating point curve as represented by $$\frac{d(I)}{dE}$$

which is the reciprocal of $$\frac{d(E)}{dI}$$

must be negative and decreasing.

The load line continues to move to the left so that the operating point curve reaches and crosses the characteristic curve 41 of Fig. 5 at position U. At position U the diode resistance is now too low for stability and as a result the operating point starts back along the moving load line toward the characteristic curve. At position V the load line loses contact with the upper portion of the characteristic curve and as a result the diode begins to change to its high resistance state. Since this readjustment takes time, the operating point traces out some such curve as shown in Fig. 5. As soon as the left hand side of Equation 3 becomes positive due to $$\frac{E_{10}R}{R+R_{16}}$$

being greater than $V_c$, the capacitor 17 stops discharging and begins to charge up again through the resistor 16. The entire cycle of operation is then repeated and continues indefinitely as long as the source of power 10 is coupled in the circuit.

The period of oscillation for the circuit arrangement of Fig. 1 is equal to approximately the time T required to charge the capacitor 17 to the critical voltage $V_{ck}$ which is represented in Fig. 5 by the point P. This time can be determined from the following solution of Equation 3.

$$V_c=V_{co}C-\frac{(R+R_{16})}{(RR_{16})}\frac{t}{C_{17}}+\frac{E_{10}R}{R+R_{16}}\left[1-C-\frac{(R+R_{16})}{(RR_{16})}\frac{t}{C_{17}}\right] \quad (7)$$

where $V_{co}$ is the capacitor voltage at the beginning of the charging cycle when $t=0$. Now inasmuch as at the beginning of a charging cycle $V_{co}$ is of a negligible magnitude and the value R is much greater than $R_{16}$ the Equation 7 may be written as follows $$V_{ck}\simeq E_{10}\left[1-C-\frac{(T)}{(R_{16}C_{17})}\right] \quad (8)$$

which upon solving for T results in $$T\simeq R_{16}C_{17}\log\left[\frac{1}{1-\frac{V_{ck}}{E_{10}}}\right] \quad (9)$$

Since the time of discharge is small compared with the time of charge, the frequency of oscillations is approximately equal to the reciprocal of T. Thus it becomes apparent from Equation 9 that the frequency of oscillations of the circuit arrangement of Fig. 1 may be determined by controlling or adjusting the magnitude of either the capacitor 17, the resistor 16, the critical voltage $V_{ck}$ of the diode 15 or the source of voltage 10.

Figure 6:
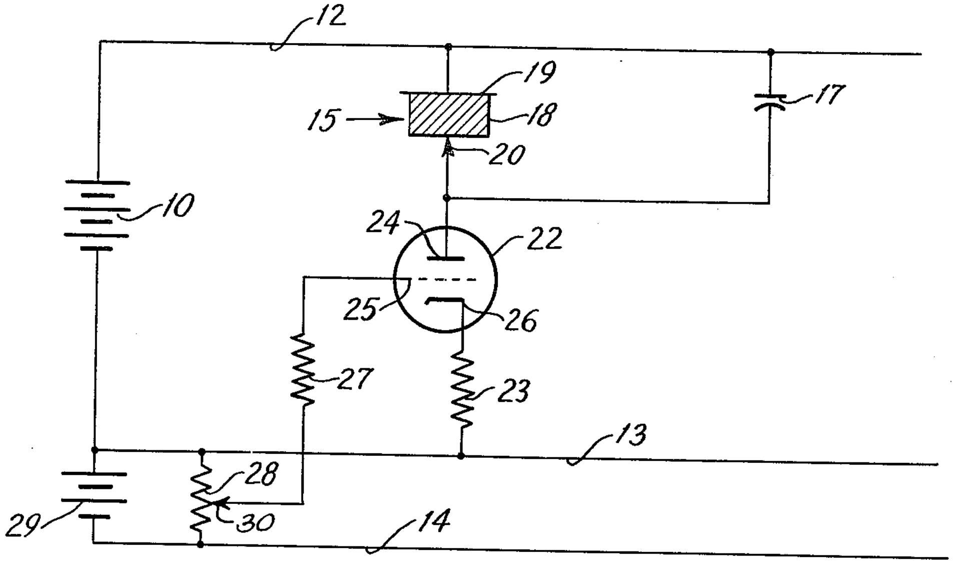
Fig. 6 is a modification of Fig. 1 in which an electron discharge device is used in the charging path for the capacitor.

In Fig. 6, which constitutes a modification of Fig. 1, there is shown a novel arrangement for determining the frequency of oscillation. In this circuit those elements similar to elements in Fig. 1 bear like reference characters. In Fig. 6, the electrical discharge device or tube 22 and the resistor 23 replace the resistor 16 of Fig. 1. The anode 24 of the tube 22 is coupled directly to the whisker 20 while the cathode 26 is connected through the resistor 23 to the line 13. The control grid 25 of the tube 22 is slidably coupled through the limiting resistor 27 to the potentiometer 28 coupled across the lines 13 and 14 respectively connected to the high and low side of the bias supply source 29. The bias potential applied to the control grid 25 is adjusted so that the tube 22 is always in a conducting condition.

Besides varying the magnitude of the capacitor 17 and the source of power 10, the frequency of oscillations of the circuit of Fig. 6 may be determined by adjusting the position of the wiping arm 30 on the potentiometer 28 which in turn determines the plate resistance of the tube 22. Since the period of the circuit, which is equal to the reciprocal of the frequency, is dependent upon the magnitude of the time constant circuit elements including the capacitor 17, the plate resistor of the tube 22 and the resistor 23, it is obvious that therefore the frequency of oscillation is also dependent upon the plate resistance of the tube 22.

The operation of the circuit arrangement of Fig. 6 is similar to that of Fig. 1 inasmuch as the capacitor 17 will be charged up through a path including the tube 22 and the resistor 23 and will be discharged through the crystal diode 15 when it is in a low resistance state. When the capacitor 17 builds up a charge equal in magnitude to the peak voltage of the characteristic of the diode, the diode will change from a high to a low resistance state thereby presenting a discharge path for the capacitor 17. During the charging cycle, the grid voltage of the tube 22 remains fixed while the plate potential and current decrease, and during the discharge cycle the grid voltage remains fixed while the plate potential and current increase.

Figure 7:
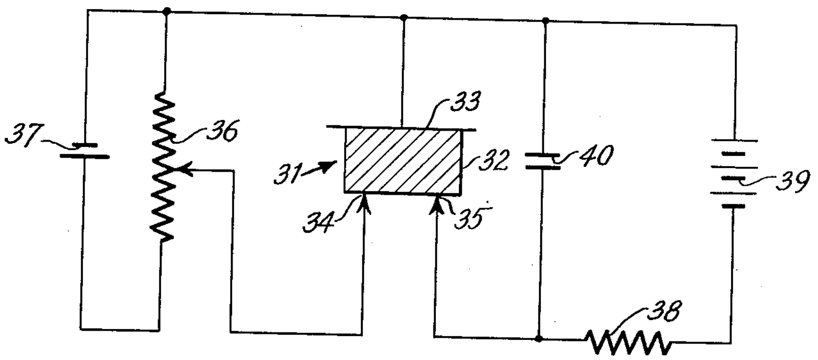
Fig. 7 is another modification of the invention in which a crystal triode is employed instead of a crystal diode.

Another modification of the circuit of Fig. 1 which enables the frequency of oscillation to be varied is shown in Fig. 7. In this modification the crystal triode 31 replaces the crystal diode 15 of Fig. 1 thereby providing means for adjusting the value of the critical voltage $V_{ck}$ which adjustment according to Equation 9 enables the frequency of oscillation to be varied.

The triode 31 includes a block of semi-conductive element 32 which is plated with a metallic base 33 on one surface and connected with a pair of extremely fine metallic electrodes 34 and 35 on the parallel surface. The electrode 34 commonly referred to as the emitter is slidably coupled to the potentiometer 36 coupled across a source of bias potential 37 so as to apply a positive bias to the emitter 34. The electrode 35 commonly referred to as the collector is coupled through the load resistor 38 to the voltage supply 39 in such a manner as to apply a negative bias to the collector electrode 35. A capacitor 40 is connected in parallel with the load resistor 38 and the voltage supply 39.

Figure 8:
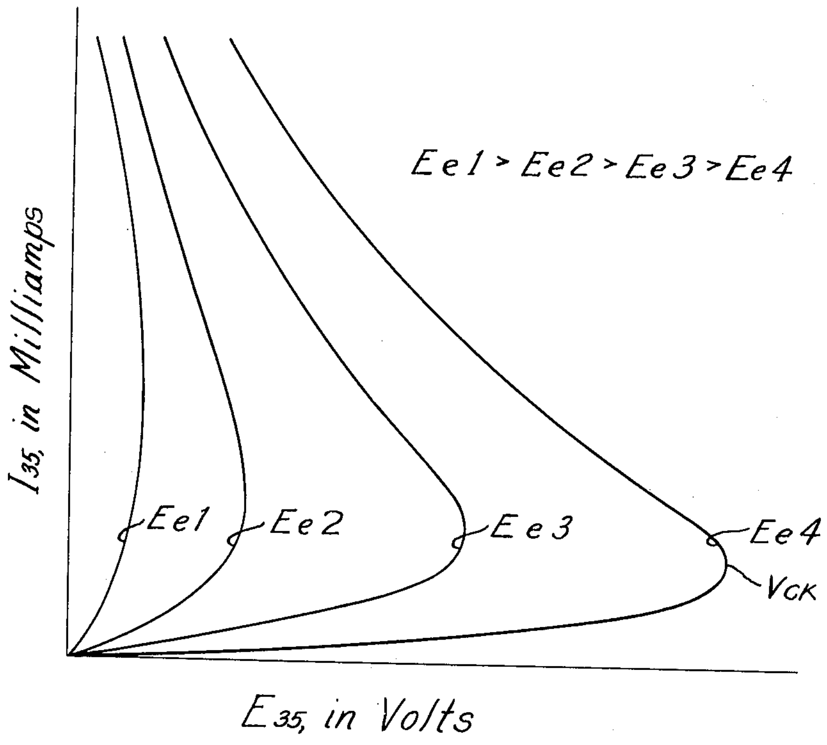
Fig. 8 is a family of electrical characteristic curves for the circuit arrangement of Fig. 7.

In the operation of the circuit arrangement of Fig. 7, it is believed sufficient to state, in view of the applicant's copending application Serial No. 177,446, filed August 3, 1950, thoroughly describing the functioning of a crystal triode or transistor, that a variation in the emitter bias potential operates upon the electrical characteristic of the triode in such a manner so as to induce a change in the magnitude of the critical voltage $V_{ck}$. This is shown in Fig. 8 where it is noted that as the emitter biasing potential decreases the value of the critical voltage $V_{ck}$ increases.

Now referring back to Equation 9 it becomes obvious that an adjustment of the emitter biasing potential which causes a change in the critical voltage $V_{ck}$ produces a change in the frequency of oscillations.

Figure 9:
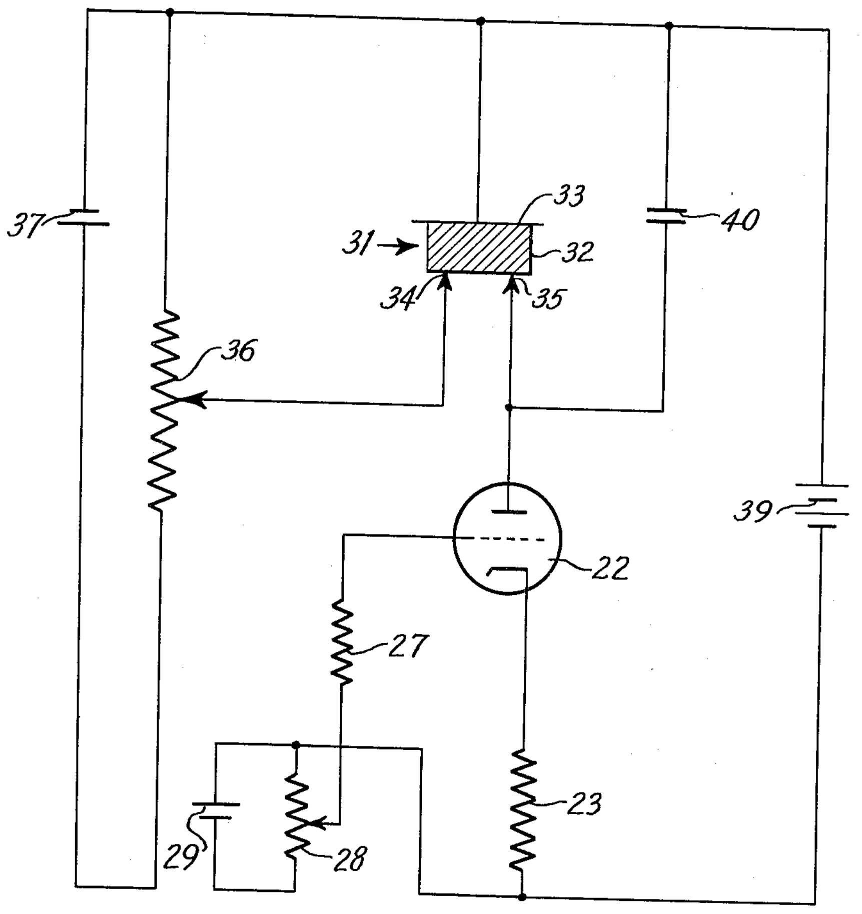
Fig. 9 is a further modification of the invention in which an electron discharge device is used with a crystal triode.

A further modification of the invention is shown in Fig. 9 which includes two independent means for controlling the frequency of oscillation. In this modification the frequency may be adjusted by adjusting the bias potential of either the emitter electrode 34 or the control grid of the tube 22 each of which operation has been previously described. The tube 22 serves as an adjustable resistance which controls the frequency of operation of the oscillator in accordance with the theory described in connection with the embodiment of Fig. 6. By adjusting the control grid bias, the resistance of the anode-cathode path of tube 22 is changed. The vacuum tube 22, in effect, replaces resistor 16 in the embodiment of Fig. 1 wherein the frequency change for variation of this resistor 16 is discussed. The emitter electrode in Fig. 9 functions according to the transistor theory to control the impedance of the base-collector path, thereby effecting the critical voltage at which the base-collector path assumes the negative resistance characteristic. The vacuum tube 22 (Fig. 9) functions through its grid bias control to determine the charging rate of the capacitor 40 as one means of adjusting the oscillator frequency. The emitter bias adjustment controls the amount of charge required in the capacitor 40 to produce the negative resistance status in the base-collector circuit thus providing a second means for controlling the bias oscillator. The bias adjustment for the tube 22 and the emitter bias adjustment for the crystal triode 31 each operate independently of one another, and each exerting a degree of control over the frequency of the oscillator. The vacuum tube bias may be adjusted to increase or decrease the frequency of oscillation without effecting the emitter, and vice versa. A change in oscillator frequency produced as a result of one control adjustment may be supplemented or diminished by adjustment of the second control. The two adjustments may be made separately or simultaneously to produce a net change.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. An oscillation generator comprising an electron discharge device having a cathode, anode and control electrode, crystal triode means having a current voltage relationship such that the current is a multi-value function of the voltage characteristic, said crystal triode being serially coupled to said device, means for biasing said device, and capacitor means coupled across said crystal triode, said capacitor being charged through said device with the current through said crystal triode being of one value and discharged through said crystal triode with the current through said crystal triode being of a second value.

2. An oscillation generator comprising a variable resistance element having a positive and negative resistance characteristic, said element comprising a body of semi-conductive material and at least three metallic electrodes electrically connected thereto, a positive biasing potential applied to one of said electrodes, a source of negative biasing potential and resistor means serially coupled to another of said electrodes, and capacitor means connected across said another electrode and the third electrode, said positive biasing potential upon being varied changing the electrical characteristic of said element whereby the frequency of oscillation is made to vary.

3. In combination, a variable resistance element comprising a block of semi-conductive material and an emitter, collector and base electrodes, said emitter and collector electrodes being electrically coupled to one side of said block, means for electrically coupling said base electrode to a side of said block parallel to said one side, means for applying a positive biasing potential to said emitter electrode, resistor means serially coupling said collector electrode with a source of negative biasing potential, and capacitive means coupled across said base and collector electrodes.

4. In combination, a circuit element comprising a block of semi-conductive material having a first, second and third electrodes directly connected thereto, means for applying a positive biasing potential to said first electrode, means serially coupling said second electrode with an electron discharge device, a resistor and a source of negative biasing potential, biasing means coupled to said device, and capacitive means coupled across said second and third electrodes.

5. An oscillation generator comprising a circuit element comprising a block of semi-conductive material, a first and second electrode electrically coupled to one side of said block, a third electrode electrically coupled to another side of said block, means for applying a first biasing potential to said first electrode, means including an electron discharge device for coupling said second electrode to a second biasing potential, means for applying a third biasing potential to said device, the frequency of oscillation of said generator being determined by adjusting either of said first or third biasing potentials.

References Cited in the file of this patent

UNITED STATES PATENTS 2,053,536 Schlesinger ------------ Sept. 8, 1936

2,469,569 Ohl ------------------ May 10, 1944

2,570,938 Goodrich -------------- Oct. 9, 1951

OTHER REFERENCES

RCA Review, pages 5 to 16, March 1949, Issue No. 1, "Some Novel Circuits for the Three Terminal Semiconductor Amplifier," by Webster, Eberhard and Barton.